US007123744B2

(12) United States Patent
Muratani et al.

(10) Patent No.: US 7,123,744 B2
(45) Date of Patent: Oct. 17, 2006

(54) DIGITAL WATERMARK EMBEDDING METHOD, DIGITAL WATERMARK EMBEDDING APPARATUS, DIGITAL WATERMARK DETECTING METHOD, AND DIGITAL WATERMARK DETECTING APPARATUS

(75) Inventors: Hirofumi Muratani, Kawasaki (JP); Tooru Kambayashi, Chigasaki (JP); Tomoo Yamakage, Yokohama (JP); Shinichiro Koto, Kawasaki (JP); Tomoya Kodama, Kawasaki (JP); Hisashi Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 721 days.

(21) Appl. No.: 10/305,192

(22) Filed: Nov. 27, 2002

(65) Prior Publication Data

US 2003/0108219 A1 Jun. 12, 2003

(30) Foreign Application Priority Data

Nov. 30, 2001 (JP) ............................. 2001-367944

(51) Int. Cl.
*G06K 9/00* (2006.01)
(52) U.S. Cl. ....................................... 382/100; 713/176
(58) Field of Classification Search ................ 382/100, 382/232; 380/51, 54, 201, 210, 252, 287; 370/522–529; 725/9, 20, 22; 704/200.1, 704/273; 713/176, 179; 348/461, 463; 358/3.28; 283/72, 74–81, 85, 93, 113, 901, 902
See application file for complete search history.

(56) References Cited

U.S. PATENT DOCUMENTS

| 6,424,725 B1 * | 7/2002 | Rhoads et al. .............. 382/100 |
| 6,522,767 B1 * | 2/2003 | Moskowitz et al. ........ 382/100 |
| 6,611,607 B1 * | 8/2003 | Davis et al. ................ 382/100 |
| 6,625,297 B1 * | 9/2003 | Bradley ...................... 382/100 |
| 6,683,966 B1 * | 1/2004 | Tian et al. ................... 382/100 |
| 6,912,294 B1 * | 6/2005 | Wang et al. ................ 382/100 |

FOREIGN PATENT DOCUMENTS

| JP | 10-308867 | 11/1998 |
| JP | 11-355547 | 12/1999 |
| JP | 2001/209806 | 8/2001 |
| JP | 2002-135557 | 5/2002 |
| WO | WO 01/52181 | 7/2001 |

OTHER PUBLICATIONS

S-K. Lee, et al., IEEE Transactions on Consumer Elecrtronics, vol. 46, No. 3, XP-001142898, pp. 744-750, "Digital Audio Watermarking in the Cepstrum Domain", Aug. 2000.

(Continued)

*Primary Examiner*—Jingge Wu
*Assistant Examiner*—Abolfazl Tabatabai
(74) *Attorney, Agent, or Firm*—Oblon, Spivak, McClelland, Maier & Neustadt, P.C.

(57) ABSTRACT

A digital watermark embedding apparatus comprises a digital watermark generating unit which transforms embedding target contents by using a filter having a coefficient with a periodic number sequence to generate a digital watermark, and an embedding unit which superposes the digital watermark on the embedding target contents to generate watermark embedded contents.

9 Claims, 6 Drawing Sheets

OTHER PUBLICATIONS

L. Boney, et al., Proceedings of the Third IEEE International Conference on Multimedia Computing and Systems, XP-002260347, pp. 473-480, "Digital Watermarks for Audio Signals", Jun. 17-23, 1996.

S. W. Foo, et al., Proceedings of IEEE Region 10 International Conference on Electrical and Electronic Technology, vol. 1 of 2, XP-010556300, pp. 509-513, "An Adaptive Audio Watermarking System", Aug. 19, 2001.

B-S. Ko, et al., IEEE International Conference on Acoustics, Speech, and Signal Processing, vol. 2, XP-002260348, pp. II-2001-II-2004, "Time-Spread Echo Method for Digital Audio Watermarking Using PN Sequences", May 13-17, 2002.

H. O. OH, et al., IEEE International Conference on Acoustics, Speech, and Signal Processing, vol. 3, XP-001172486, pp. 1341-1344, "New Echo Embedding Technique for Robust and Imperceptible Audio Watermarking", May 7-11, 2001.

R. Petrovic, et al., Telecommunications in Modern Satellite, Cable and Broadcasting Services, XP-010359110, pp. 88-95, "Data Hiding Within Audio Signals", Oct. 13-15, 1999.

D. Kirovski, et al., IEEE International Conference on Acoustics, Speech, and Signal Processing, vol. 3, XP-002269686, pp. 1345-1348, "Robust Spread-Spectrum Audio Watermarking", May 7-11, 2001.

J. R. Hernandez Martin, et al., IEEE Communications Magazine, vol. 39, No. 8, XP-002269687, pp. 110-116, "Information Retrieval in Digital Watermarking", Aug. 2001.

M. Kutter, Proceedings of the SPIE Conference on Multimedia Systems and Applications, vol. 3528, XP-000978280, pp. 423-431, "Watermarking Resisting to Translation, Rotation, and Scaling", 1999.

U.S. Appl. No. 10/305,192, filed Nov. 27, 2002, Muratani et al.

U.S. Appl. No. 10/626,610, filed Jul. 25, 2003, Asano et al.

U.S. Appl. No. 10/305,192, filed Nov. 27, 2002, Pending.

U.S. Appl. No. 10/327,072, filed Dec. 24, 2002, Pending.

W. Bender, et al., IBM Systems Journal, vol. 35, No. 3&4, pp. 313-336, "Techniques for Data Hiding".

* cited by examiner

DIGITAL WATERMARK EMBEDDING METHOD, DIGITAL WATERMARK EMBEDDING APPARATUS, DIGITAL WATERMARK DETECTING METHOD, AND DIGITAL WATERMARK DETECTING APPARATUS

CROSS-REFERENCE TO RELATED APPLICATIONS

This application is based upon and claims the benefit of priority from the prior Japanese Patent Application No. 2001-367944, filed Nov. 30, 2001, the entire contents of which are incorporated herein by reference.

BACKGROUND OF THE INVENTION

1. Field of the Invention

The present invention relates to a digital watermark embedding method, a digital watermark embedding apparatus, a digital watermark detecting method, and a digital watermark detecting apparatus.

2. Description of the Related Art

Popularization of apparatuses for recording and reproducing digital image data such as digital video cassette recorders and DVD (digital versatile disk) systems results in offers of various digital moving picture images which can be reproduced by the apparatus. Furthermore, various digital moving picture images are distributed through digital television broadcasting by using internet, broadcasting satellite, and communication satellite, so that it is being possible for users to use the high quality digital moving picture images.

In the digital moving picture image, since high quality duplicate can be easily produced at a state of a digital signal level, it is a danger of the unlimited duplicate in case that duplicate prohibition or duplicate control is not given. Accordingly, in order to prevent illegal duplicate of the digital moving picture image or in order to control a generation number of the duplicate by normal users, a method for limiting the duplicate, which information for the duplicate control is added to the digital moving picture image and the illegal duplicate is prevented by using the additional information, has been proposed.

The digital watermark is known as a technique which superposes other additional information on the digital moving picture image. In the digital watermarking technique, information (referred to as "watermark information") such as identifying information of a copyright holder or a user of contents, information of right of the copyright holder, a condition of utilization of the contents, secret information necessary for utilizing, or the above-described information of the duplicate control is embedded on digital contents such as digitalized data of sound, music, moving picture image, and static picture image such that it is not easy to perceive the information. Then, by detecting the watermark information from the embedded contents if necessary, protection of the copyright containing utilizing control and the duplicate control or promotion of secondary utilization can be performed.

Generally, the digital contents express as a set of a plurality of digital data which is a component of the digital contents. For example, in case that the digital contents are a digital image, the digital contents include a set of pixels. The digital contents are expressed as p=(p(z)). Where z of the contents should be a parameter showing a position of the component (for example, pixel), and p(z) should express a data value (for example, pixel value) of the component of the position z.

The digital watermark means other data which are embedded in the contents by varying the data value of one or more components in the contents. As shown generally in the following equation (1), embedding of the digital watermark generates data F[p] having which embedding target contents p is carried out by a transformation F and superposes the data F[p] on the embedding target contents p, which allows embedded contents E[p] to be produced.

$$E[p]=p+F[p] \quad (1)$$

On the other hand, detection of the embedded digital watermark generates data G[p'] which detecting target contents p' is carried out by a transformation G and carries out whether cross-correlation between the data G[p'] and the detecting target contents p' exceeds a certain threshold value $Th_1$ or not.

$$p' * G[p'] = \sum_z p'(z)G[p'](z) \quad (2)$$

That is, $$D[p']=\theta(p'*G[p']-Th_1) \quad (3)$$

where θ(x) is 1 in case of x≧0 (deciding that the digital watermark is in the detecting target contents), and θ(x) is 0 and a step function in case of x<0 (deciding that the digital watermark is not in the detecting target contents), so that a detecting result D[p'] is obtained according to the step function. The transformation G in detecting may be the same as the transformation F in embedding for simplifying.

Scaling is one of typical attacks for erasing or altering the digital watermark (enlargement or reduction in case of the image). When the scaling is carried out, the parameter z assigning the component of the contents is transformed under the scaling of a scaling rate α as follows:

$$z \mapsto \alpha z+z_0 \quad (4)$$

where, $z_0$ is a constant showing a fixed point for the scaling.

For this reason, the watermark can not be detected even though the transformation G is carried out to find the cross-correlation.

A method called "echo hiding" which is a digital watermarking technique for music is known as a digital watermarking method being robust against the scaling (W. Bender, D. Gruhl, N. Morimoto and A. Lu, "Techniques for data hiding", IBM Systems Journal, Vol. 35, Nos. 3&4, 313–336, 1996.: hereinafter referred to as "the reference").

$$F[p](z)=p(z+\delta)$$

$$G[p](z)=p'(z+\Delta) \quad (5)$$

That is, the parameter z is shifted by δ in case of embedding the digital watermark, and the parameter z is shifted by Δ in case of detecting the digital watermark. In this method, because detection is carried out by varying a value of Δ during detecting the digital watermark, even though the parameter z is transformed by scaling, the detecting result D[p'] of the digital watermark outputs "1" in case of Δ=αδ, namely it is expected that there is a decision that the digital watermark is in the detecting target contents.

However, the reference is not effective in a digital watermark embedding/detecting method in which auto-correlation of the embedded contents has a peak. This is because once an outsider has learned the digital watermark embedding/detecting method, by analyzing whether or not the remarkable (unnatural) peak exists in the auto-correlation, the outsider determines whether or not the digital watermark is in the contents to erase or alter easily the digital watermark. Accordingly, it is desirable to realize a digital watermark embedding/detecting method not having a remarkable peak in the auto-correlation and being robust against the scaling.

BRIEF SUMMARY OF THE INVENTION

The present invention is directed to method and apparatus that substantially obviates one or more of the problems due to limitations and disadvantages of the related art.

It is an object of the present invention to provide a digital watermark embedding method, a digital watermark embedding apparatus, a digital watermark detecting method, and a digital watermark detecting apparatus which can correctly detect embedded digital watermark information even when the embedded digital watermark information is scaled and which it is hardly found whether or not the digital watermark is in the embedded contents.

According to an embodiment of the present invention, a digital watermark embedding apparatus comprises:

a digital watermark generator which generates a digital watermark by transforming an embedding target content with a coefficient of a periodic number sequence; and an embedding unit which embeds the digital watermark in the embedding target content.

According to an embodiment of the present invention, a digital watermark embedding method comprises:

generating a digital watermark by transforming an embedding target content with a coefficient of a periodic number sequence; and embedding the digital watermark in the embedding target content.

According to an embodiment of the present invention, a digital watermark detecting apparatus comprises:

a transforming unit which transforms a detecting target content with a coefficient of a periodic number sequence;

a first cross-correlation calculator which calculates a first cross-correlation between the transformation result and the detecting target content;

an auto-correlation calculator which calculates an auto-correlation of the first cross-correlation;

a scaling rate calculator which calculates a scaling rate based on a peak position of the auto-correlation and a period of the periodic number sequence;

a scaling unit which scales one of the first cross-correlation and the periodic number sequence;

a second cross-correlation calculator which calculates a second cross-correlation between the first cross-correlation scaled and the periodic number sequence not scaled or between the first cross-correlation not scaled and the periodic number sequence scaled; and a detector which detects whether a digital watermark is embedded in the detecting target contents based on the second cross-correlation.

According to an embodiment of the present invention, a digital watermark detecting method comprising:

transforming a detecting target content with a coefficient of a periodic number sequence;

calculating a first cross-correlation between the transformation result and the detecting target content;

calculating an auto-correlation of the first cross-correlation;

calculating a scaling rate based on a peak position of the auto-correlation and a period of the periodic number sequence;

scaling one of the first cross-correlation and the periodic number sequence;

calculating a second cross-correlation between the first cross-correlation scaled and the periodic number sequence not scaled or between the first cross-correlation not scaled and the periodic number sequence scaled; and detecting whether a digital watermark is embedded in the detecting target content based on the second cross-correlation.

DETAILED DESCRIPTION OF THE INVENTION

An embodiment of a digital watermark embedding apparatus and a digital watermark detecting apparatus according to the present invention will now be described with reference to the accompanying drawings.

First Embodiment

Figure 1:
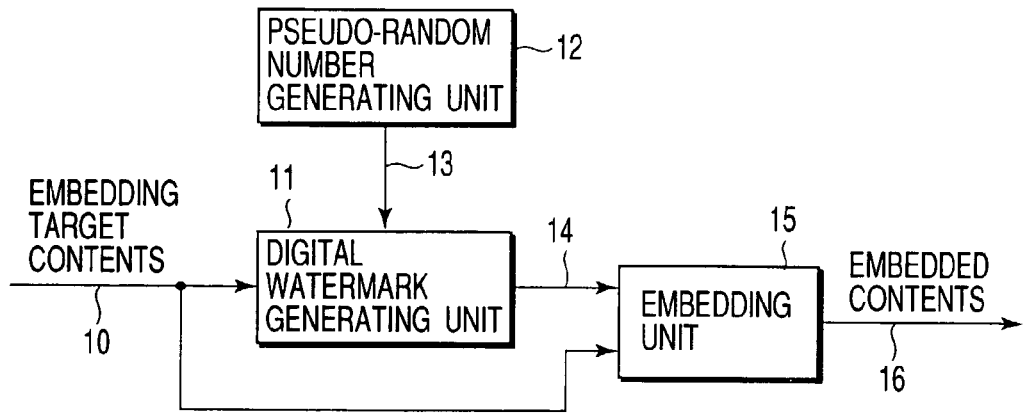
FIG. 1 is a block diagram showing an arrangement of a digital watermark embedding apparatus according to a first embodiment of the present invention.

FIG. 1 shows an arrangement of a digital watermark embedding apparatus according to the first embodiment of the present invention. For example, a digitalized image signal of a moving picture image or a static picture image or a digitalized sound signal is input as contents 10, in which watermark information should be embedded (hereinafter referred to "embedding target contents"), to the digital watermark embedding apparatus.

The embedding target contents 10 are input to a digital watermark generating unit 11 and a embedding unit 15. In the digital watermark generating unit 11, a transformation based on a periodic number sequence 13 (in this embodiment, a periodic pseudo-random number sequence) generated by a pseudo-random number generating unit 12 is carried out for the embedding target contents 10 to generate a digital watermark 14 to be embedded in the embedding target contents 10. The pseudo-random number sequence 13 is a sequence that a bit of "0" and a bit of "1" generate in random, the sequence is to be repeatedly generated in a certain period. The pseudo-random number sequence 13 is treated as a secret key and is not in public.

In the embedding unit 15, contents 16 in which the watermark information has been embedded (hereinafter referred to as "embedded content") are generated by embedding the digital watermark 14 in the embedding target contents 10. The embedded contents 16 generated in the above-described way are recorded in a recording medium by a digital image recording and reproducing apparatus such as a DVD system or transmitted through a transmission medium such as the internet, the broadcasting satellite, and the communication satellite.

The digital watermark generating unit 11 will be described in more detail below. In the digital watermark generating unit 11, a transformation shown in the following equation (6) is carried out to generate the pseudo-random number sequence 13:

$$F[p](z) = \sum_y f_y p(z+y) \quad (6)$$

where F[p] represents a digital watermark; p represents embedding target contents; z represents a parameter assigning a component of the embedding target contents p; $f_y$ represents a periodic pseudo-random number sequence; and y represents an integer number expressing a number of a term of the periodic pseudo-random number sequence.

That is, in the example of the reference described above, the following equation (7) is correspondent to $f_y$ in the equation (6):

$$f_y = \begin{cases} 1 & y = \delta \\ 0 & \text{otherwise} \end{cases} \quad (7)$$

However, in the embodiment, as shown in the following equation (8), $f_y$ is the pseudo-random number sequence (for example, a sequence following Gaussian distribution) having a period P:

$$f_i \in N(\sigma, 0)$$

$$f_{i+P} = f_i \quad (8)$$

where, σ expresses dispersion in the Gaussian distribution.

Figure 2:
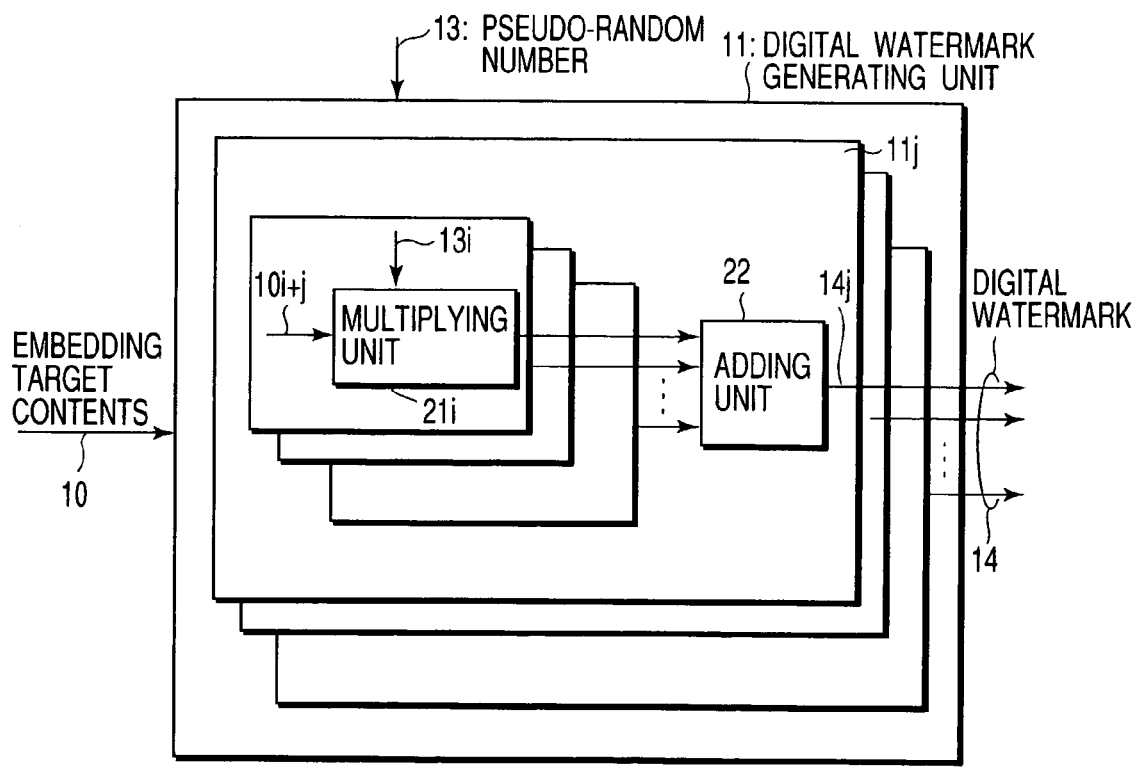
FIG. 2 is a block diagram showing an arrangement of a digital watermark generating unit in FIG. 1.

FIG. 2 shows an arrangement of the digital watermark generating unit 11 calculating the equation (6).

The digital watermark generating unit $11_j$ includes a multiplying unit $21_i$ provided corresponding to each i calculating a product of an (i+j)-th component $10_{i+j}$ of the embedding target contents by an i-th component $13_i$ of the pseudo-random number sequence 13 and an adding unit 22 adding an output of the multiplying unit $21_i$ correspondent to all the i's to output a j-th component $14_j$ of the digital watermark 14, which is provided corresponding to each j, consequently the digital watermark generating unit 11 is arranged.

On the other hand, the embedding unit 15 in FIG. 1 outputs the embedded contents 16 whose component is that the digital watermark 14 output from the digital watermark generating unit 11 and the embedding target contents 10 are added in every component. The digital watermark 14 may be embedded in the embedding target contents 10 after multiplying the digital watermark 14 by a properly minute factor such that the digital watermark 14 is more inconspicuous than the component of the embedding target contents 10.

When the embedded contents 16 in which the digital watermark is embedded is generated by embedding the watermark information, as described below, the watermark information which is embedded as the digital watermark in the embedded contents 16 can be certainly detected even when the embedded contents 16 is scaled (enlargement or reduction in case that the embedded contents 16 is an image).

The embedded contents 16 generated in the above-described way does not show a remarkable peak in the auto-correlation, because, as shown in the equation (6), the digital watermark 14 generated by the transformation with a coefficient of the periodic pseudo-random number sequence 13 for the embedding target contents 10 is embedded in the embedding target contents 10. Accordingly, the embedded contents 16 is robust against peak analysis of the auto-correlation by a hacker who tries to alter or erase the digital watermark 14, so that the embedded contents 16 has an advantage that it is hardly found whether or not the digital watermark is in the embedded contents 16 by the hacker.

Figure 3:
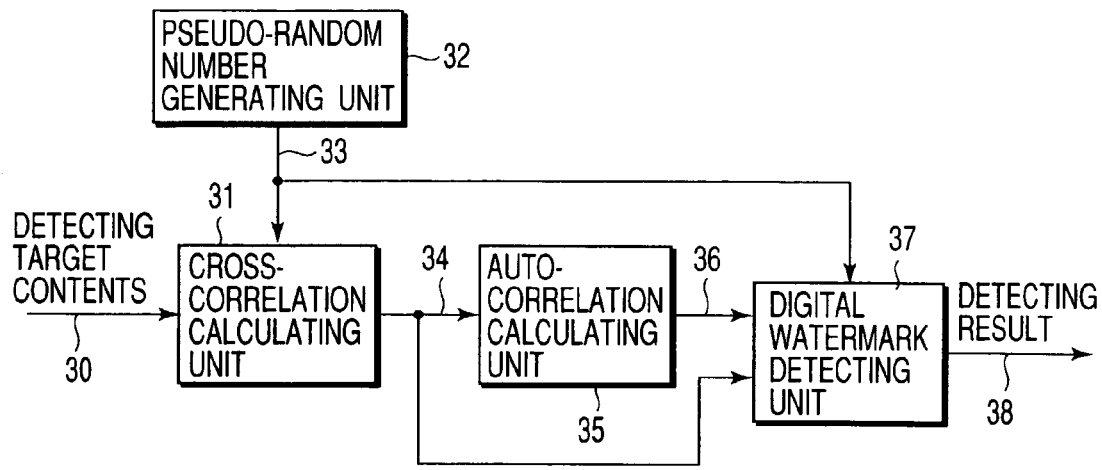
FIG. 3 a block diagram showing an arrangement of a digital watermark detecting apparatus according to the first embodiment.

FIG. 3 shows an arrangement of a digital watermark detecting apparatus according to the first embodiment. Target contents 30 from which the embedded watermark information should be detected (hereinafter referred to as "detecting target contents") are input to the digital watermark detecting apparatus.

There are a case which the embedded contents 16 generated by the digital watermark embedding apparatus shown in FIG. 1 are input through the recording medium or the transmission medium as the detecting target contents and also a case which other contents in which no watermark is embedded are input. In other words, the detecting target contents 30 are generally a kind of contents which is unknown whether the digital watermark is embedded or not. The digital watermark detecting apparatus can also detect whether or not the digital watermark is embedded with respect to the embedded contents 16 in which, as described above, the peak of the auto-correlation is not clearly appeared.

In FIG. 3, the detecting target contents 30 are input to a cross-correlation calculating unit 31. A pseudo-random number sequence 33 generated by a pseudo-random number generating unit 32 is also input to the cross-correlation calculating unit 31. The pseudo-random number generating unit 32 generates the periodic pseudo-random number sequence 33 which is the same as the pseudo-random number sequence 13 generated by the pseudo-random number generating unit 12 in the digital watermark embedding apparatus shown in FIG. 1. The pseudo-random number sequence 33 is also treated as the secret key and is not in public. The cross-correlation calculating unit 31 generates a result which is obtained by transforming the detecting target contents 30 with a coefficient of the pseudo-random number sequence 33 generated by the pseudo-random number generating unit 32 and a first cross-correlation value 34 which is obtained by calculating cross-correlation to the detecting target contents 30.

A process in the cross-correlation calculating unit 31 comprises two steps, that is, a first step of transforming the detecting target contents 30 with the coefficient of the periodic pseudo-random number sequence 33 and a second step of calculating the cross-correlation between the result of the transformation in the first step and the detecting target contents 30 to generate the first cross-correlation value 34.

The first cross-correlation value 34 output from the cross-correlation calculating unit 31 is input to an auto-correlation calculating unit 35 and a digital watermark detecting unit 37. In the auto-correlation calculating unit 35, auto-correlation of the first cross-correlation value 34 is calculated to generate an auto-correlation value 36.

The digital watermark detecting unit 37 scales the first cross-correlation value 34 by a scaling rate to the detecting target contents 30 which is calculated by a peak position of the auto-correlation value 36, and determines whether or not the watermark information is in the detecting target contents 30 by judging a threshold value with respect to a second cross-correlation value which is generated by calculating the cross-correlation between the scaled first cross-correlation value and the pseudo-random number sequence 33. The scaling rate expresses a degree of the scaling in case that the detecting target contents 30 (for example, the embedded contents 16) are scaled, the scaling rate is an enlargement rate or a reduction rate in case that the contents are the image.

A process in the digital watermark detecting unit 37 comprises four steps, that is, a first step of calculating the scaling rate to the detecting target contents 30 from the peak position of the auto-correlation value 36, a second step of scaling the first cross-correlation value 34 by the calculated scaling rate, a third step of generating the second cross-correlation value by calculating the cross-correlation between the scaled cross-correlation value and the pseudo-random number sequence 33, and a fourth step of determining whether or not the watermark information is in the detecting target contents 30 by judging the threshold value with respect to the second cross-correlation value.

Figure 4:
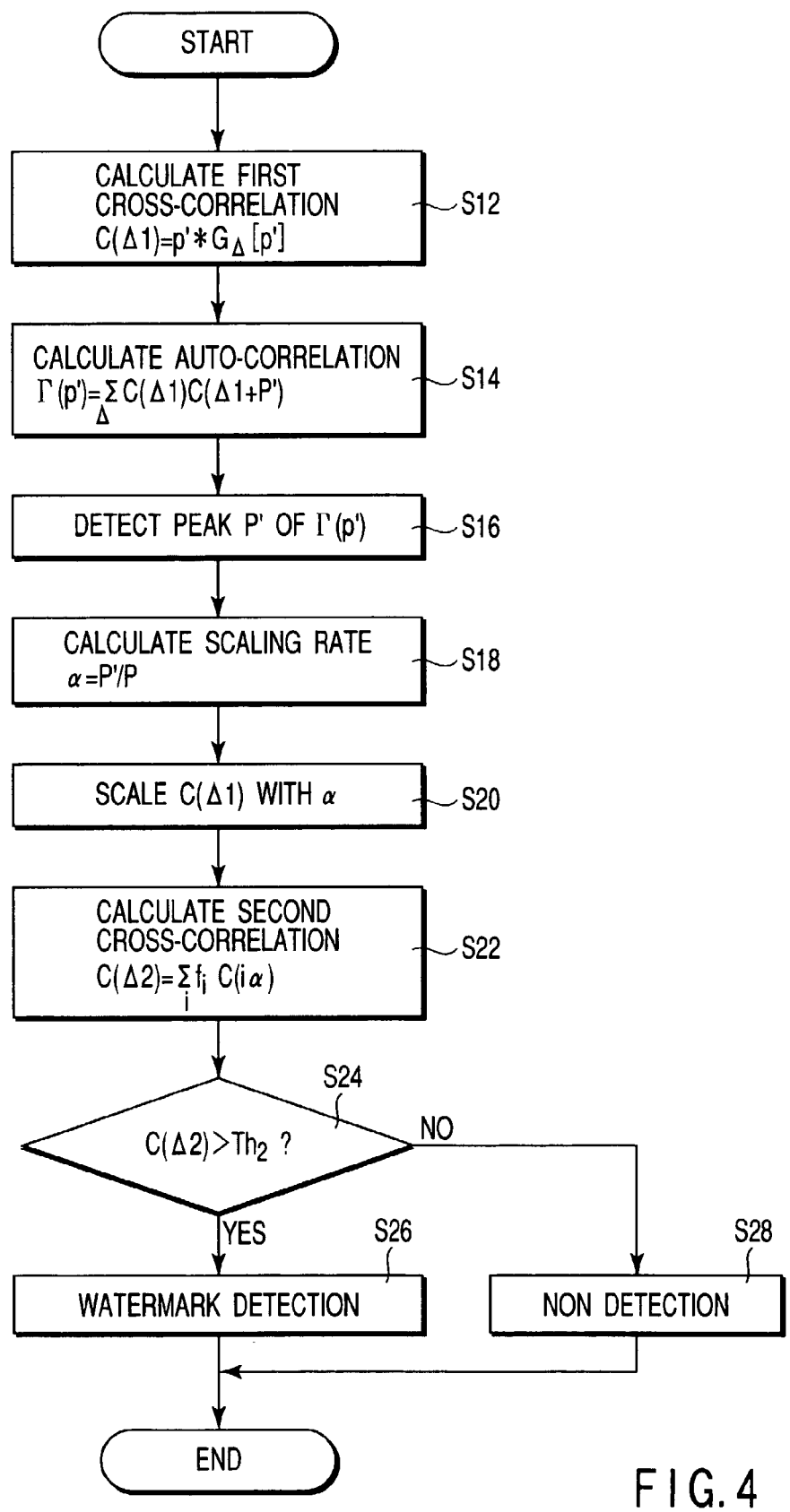
FIG. 4 a flowchart showing a digital watermark detecting process according to the first embodiment.

The above-described process of the digital watermark detecting apparatus according to the embodiment will be described below in more detail with reference to a flow chart shown in FIG. 4.

In the cross-correlation calculating unit 31, as shown in the following equation (9), the first cross-correlation between the result of the transformation to the detecting target contents 30 with the coefficient of the periodic pseudo-random number sequence 33 and the detecting target contents 30 is calculated (step S12):

$$C(\Delta 1) = p'^* G_A[p'] \tag{9}$$

where $C(\Delta 1)$ represents the first cross-correlation value 34; p' represents the detecting target contents 30; and $G_A[p']$ represents a result of transformation by a filter with a coefficient of the periodic pseudo-random number sequence 33.

In the auto-correlation calculating unit 35, as shown in the following equation (10), the auto-correlation with respect to the first cross-correlation value $C(\Delta 1)$ shown in the equation (9) is calculated (step S14):

$$\Gamma(P') = \sum_\Delta C(\Delta 1)C(\Delta 1 + P') \tag{10}$$

where $\Gamma(P')$ represents the auto-correlation value 36; and P' represents a peak position of the auto-correlation value 36. Thus, the peak is appeared every period P' in the auto-correlation value $\Gamma F(P')$.

In the digital watermark detecting unit 37, the following process is carried out.

The peak position P' (period) of the auto-correlation value $\Gamma(P')$ satisfies the following equation (11) between a period P and a scaling rate α of the pseudo-random number sequence 33.

$$\alpha = \frac{P'}{P} \tag{11}$$

When the detecting target contents 30 is not scaled, that is, α=1, the peak position P' is equal to the period P of the pseudo-random number sequence 33. For this reason, in the digital watermark detecting unit 37, first the peak position P' of the auto-correlation value $\Gamma(P')$ is detected (step S16), and then the scaling rate α is calculated by the equation (11) (step S18).

The digital watermark detecting unit 37 scales the first cross-correlation value $C(\Delta 1)$ by using the calculated scaling rate α to generate the scaled cross-correlation value (step S20). Then, the digital watermark detecting unit 37 calculates the cross-correlation between the scaled cross-correlation value and the pseudo-random number sequence 33 according to the following equation (12) to generate the second cross-correlation value (step S22):

$$C(\Delta 2) = \sum_i f_i C(i\alpha) \tag{12}$$

where $C(\Delta 2)$ represents the second cross-correlation value; $f_i$ represents the periodic pseudo-random number sequence 33; and $C(i\alpha)$ represents the scaled cross-correlation value.

Finally, the digital watermark detecting unit 37 carries out the decision of the threshold value ($Th_2$) with respect to the second cross-correlation value $C(\Delta 1)$ shown in the equation (12) by using the following relation (13) (steps S24 to S28):

$$C(\Delta 2) > Th_2 \tag{13}$$

so as to output a detecting result of the digital watermark 38. This allows the decision of the digital watermark based on the correct peak position P' to be done, even when a plurality of peaks are appeared in the auto-correlation value 36.

When the outsider (hacker) tries to alter or erase the digital watermark in the embedded contents 16 which is generated by the digital watermark embedding apparatus shown in FIG. 1, the hacker can not calculate the equations (9) and (10), because the pseudo-random number sequence 13 used in embedding and the pseudo-random number sequence 33 used in detecting with the digital watermark detecting apparatus are the secret key and the hacker does not know the secret key. Since the many peaks of the auto-correlation value generate in random according to the pseudo-random number sequence, the hacker can not recognize the remarkable peak. Consequently, the embedded contents 16 in which the digital watermark is embedded by the digital watermark embedding apparatus shown in FIG. 1 are robust against the attack.

A detail arrangement of each part of FIG. 3 will be described below referring to FIG. 5 to FIG. 8.

Figure 5:
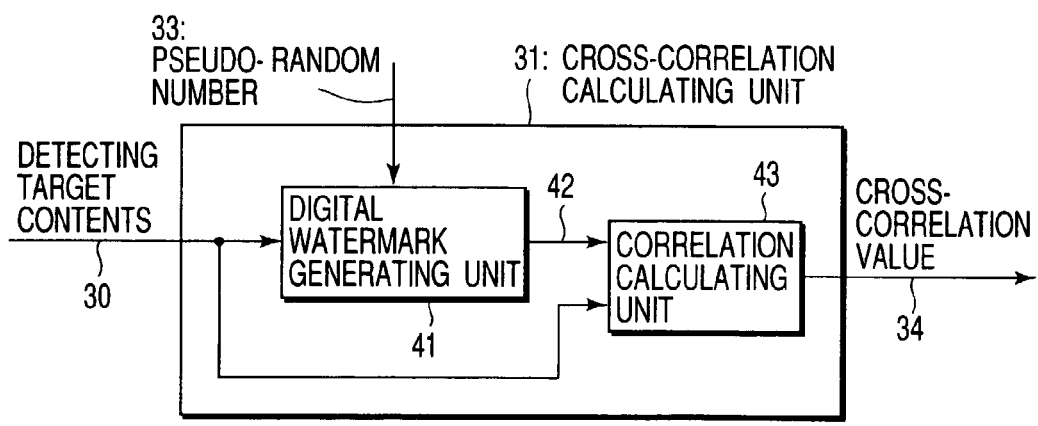
FIG. 5 is a block diagram showing an arrangement of a cross-correlation calculating unit 31 in FIG. 3.

FIG. 5 shows an arrangement of the cross-correlation calculating unit 31 in FIG. 3. The cross-correlation calculating unit 31 includes a digital watermark generating unit 41 and a correlation calculating unit 43 and carries out the calculation shown in the equation (9). The digital watermark generating unit 41 is configured, as shown in FIG. 2, in the same manner as the digital watermark generating unit 11 of the digital watermark embedding apparatus shown in FIG. 1 and carries out the transformation by the filter with the coefficient of the periodic pseudo-random number sequence 33 which is generated with respect to the detecting target contents 30 by the pseudo-random number generating unit 32. As a result of the transformation, the digital watermark generating unit 41 synthesizes a digital watermark 42 corresponding to the digital watermark 14 which is embedded in the embedding target contents 10. The correlation calculating unit 43 calculates the cross-correlation between the digital watermark 42 and the detecting target contents 30 to generate the first cross-correlation value 34.

Figure 6:
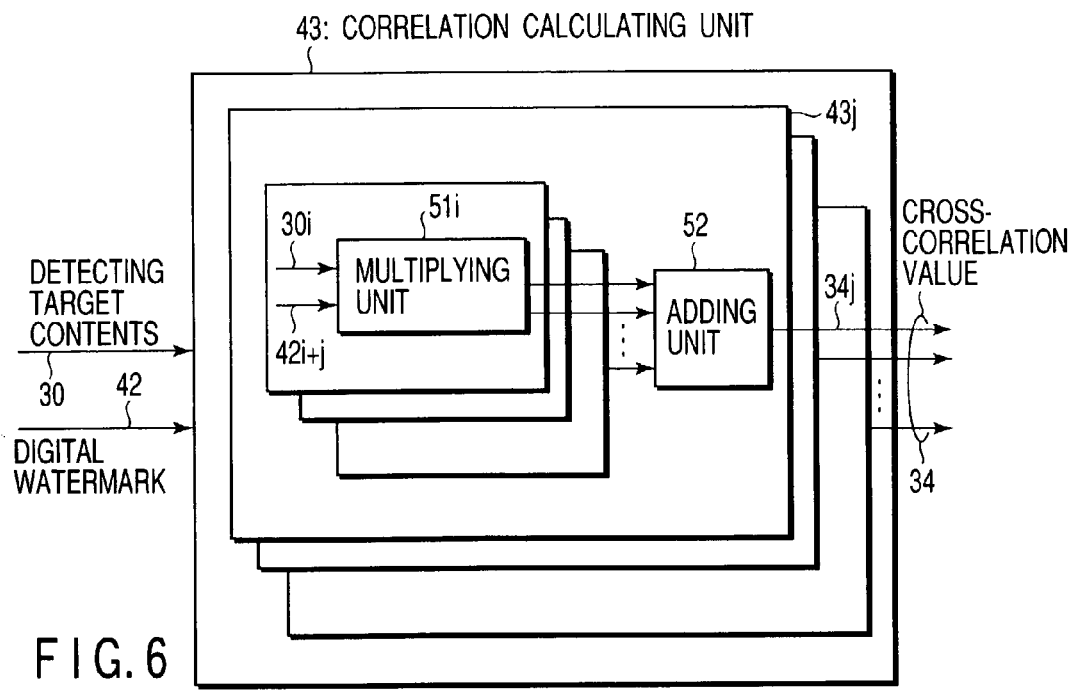
FIG. 6 is a block diagram showing an arrangement of a correlation calculating unit 43 in FIG. 5.

FIG. 6 shows a detail arrangement of the correlation calculating unit 43 shown in FIG. 5. The correlation calculating unit $43_j$ includes a multiplying unit $51_i$ provided corresponding to each i calculating a product of an i-th component $30_i$ of the detecting target contents 30 by an (i+j)-th component $42_{i+j}$ of the digital watermark 42 and an adding unit 52 adding an output of the multiplying unit $51_i$ correspondent to all the i's to output a j-th component $34_j$ of the cross-correlation value 34, which is provided corresponding to each j, consequently the correlation calculating unit 43 is arranged.

Figure 7:
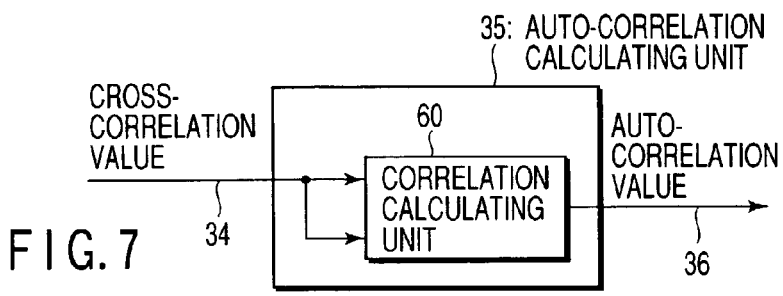
FIG. 7 is a block diagram showing an arrangement of an auto-correlation calculating unit 35 in FIG. 3.

FIG. 7 shows an arrangement of the auto-correlation calculating unit 35 shown in FIG. 3. The auto-correlation calculating unit 35 includes a correlation calculating unit 60 having the same arrangement shown in FIG. 6 as the correlation calculating unit 43 in the auto-correlation calculating unit 35 in FIG. 3. Though two inputs are the detecting target contents 30 and the digital watermark 42 in FIG. 6, on the other hand, the cross-correlation value 34 is commonly input to two inputs of the correlation calculating unit 60, so that the process shown in the equation (10) is carried out to output the auto-correlation value 36.

Figure 8:
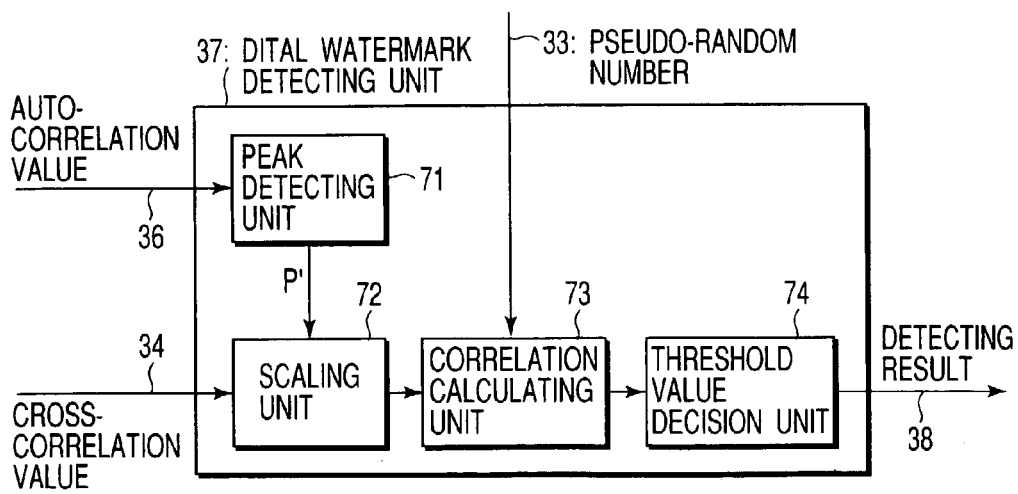
FIG. 8 is a block diagram showing an arrangement of a digital watermark detecting unit 37 in FIG. 3.

FIG. 8 shows an arrangement of the digital watermark detecting unit 37 shown in FIG. 3. The digital watermark detecting unit 37 includes a peak detecting unit 71, a scaling unit 72, a correlation calculating unit 73, and a threshold value decision unit 74, and carries out processes shown in the equations (11), (12), and (13).

The peak detecting unit 71 detects the peak position P' of the auto-correlation value 36 from the auto-correlation calculating unit 35, and then the scaling unit 72 scales the second cross-correlation value 34 according to the scaling rate α calculated by the equation (11) with the period P of the pseudo-random number sequence 33 which is given beforehand and the peak position P'. In the correlation calculating unit 73, the cross-correlation between the scaled correlation value and the periodic pseudo-random number sequence 33 is calculated by the equation (12), the second cross-correlation value which is a 0-th component of the cross-correlation is obtained. The threshold value decision shown in the equation (13) is carried out with respect to the second cross-correlation value in the threshold value decision unit 74. The threshold value decision unit 74 decides that the watermark information is embedded in the detecting target contents 30 when the second cross-correlation value exceeds the threshold value $Th_2$, and decides that the watermark information is not embedded in other cases, and the decision result is output as the digital watermark detecting result 38.

As described above, in the digital watermark embedding apparatus according to the first embodiment, the embedded contents 16 are generated in a manner that the result which the embedding target contents 10 is transformed by the filter with the coefficient of the periodic pseudo-random number sequence 13 is embedded in the embedding target contents 14.

In the digital watermark detecting apparatus, the scaling rate α for the detecting target contents is calculated from the peak position P' of the auto-correlation value 36 of the first cross-correlation value 34, which is generated by calculating the cross-correlation between the result which the detecting target contents 30 is transformed by the filter with the coefficient of the periodic pseudo-random number sequence 33 and the detecting target contents 30, and the period P of the periodic pseudo-random number sequence 33. After the first cross-correlation value 34 is scaled by the scaling rate α, the threshold value decision is carried out with respect to the second cross-correlation value generated by calculating the cross-correlation with the periodic pseudo-random number sequence 33. Consequently, it is determined whether or not the watermark information is in the detecting target contents 30.

The digital watermark can be detected even when the embedded contents 16 is scaled, robust characteristics against the scaling can be obtained. The peaks of the auto-correlation are randomized and the remarkable peak in the auto-correlation is not appeared because the result of the transformation by a filter with the coefficient of the periodic pseudo-random number sequence 13 is embedded in the embedding target contents 10 in the digital watermark embedding apparatus. Accordingly, it is difficult for the hacker to detect the peak to determine whether or not the digital watermark is in the embedded contents 16, which enable the embedded contents 16 to be robust against the alteration or the erase of the digital watermark. Furthermore, by using the periodic pseudo-random number sequence as the secret key, it is impossible to calculate the equations (9) and (10) even though the digital watermark embedding algorithm is leaked out, so that the alteration or the erase of the embedded digital watermark can not be carried out.

Other embodiments of the present invention will be described. The same portions as those of the first embodiment will be indicated in the same reference numerals and their detailed description will be omitted.

Second Embodiment

In the first embodiment, there is described the case in which the watermark information of one bit is embedded by the digital watermark embedding apparatus and the digital watermark detecting apparatus determines whether or not the watermark information is in the embedded contents. As described below, the present invention can be also applied to a digital watermark embedding apparatus and a digital watermark detecting apparatus which process watermark information of multi-bit.

Figure 9:
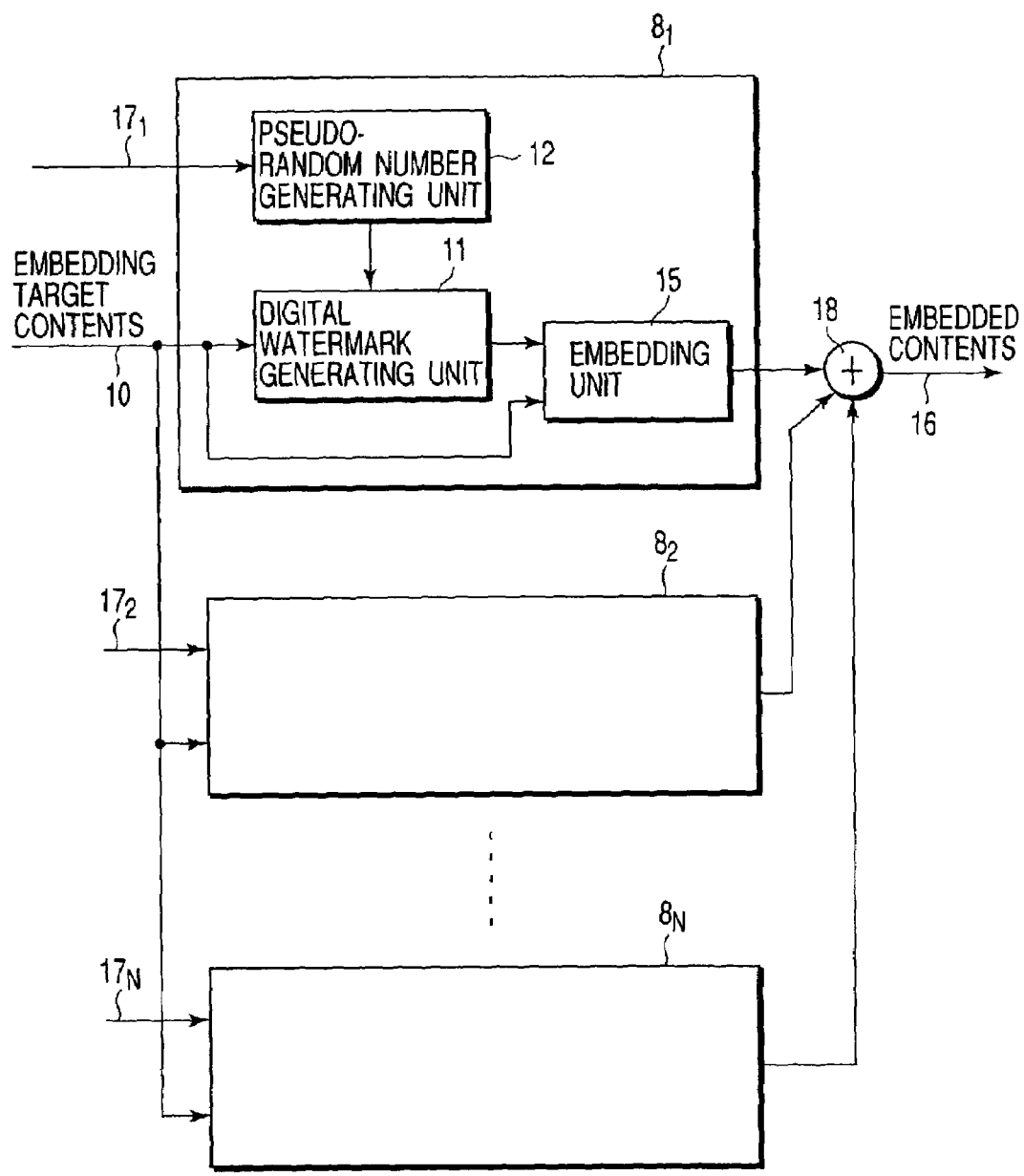
FIG. 9 is a block diagram showing an arrangement of a digital watermark embedding apparatus according to a second embodiment of the present invention.

FIG. 9 is a digital watermark embedding apparatus according to the second embodiment of the present invention, which embeds the watermark information of N bits $17_1$ to $17_N$ (N is plural number). The digital watermark embedding apparatus includes the N-number of digital watermark embedding units $8_1$ to $8_N$, wherein the digital watermark embedding apparatus including the digital watermark generating unit 11, the pseudo-random number generating unit 12, and the embedding unit 15 in FIG. 1 is one digital watermark embedding unit. The embedding target contents 10 are commonly input to the digital watermark embedding units $8_1$ to $8_N$.

The watermark information of N bits $17_1$ to $17_N$ are input to the pseudo-random number generating units 12 in the digital watermark embedding units $8_1$ to $8_N$ respectively. Each pseudo-random number generating unit 12 generates the different pseudo-random number sequence according to, for example, each bit value ("0" or "1") of the watermark information of N bits $17_1$ to $17_N$. In another example, the pseudo-random number generating unit 12 may generate the pseudo-random number sequence having a reverse polarity according to each bit value of the watermark information of N bits $17_1$ to $17_N$. Furthermore, the pseudo-random number generating units 12 may generate the pseudo-random number sequence or a sequence having all "0" (which corresponds to not embedding) according to each bit value of the watermark information of N bits $17_1$ to $17_N$.

In the digital watermark embedding units $8_1$ to $8_N$, after the digital watermark is embedded in the embedding target contents 10 by the same process as the first embodiment, the embedded contents 16 in which the watermark information of N bits is embedded is generated by adding outputs of the digital watermark embedding units $8_1$ to $8_N$ in an adding unit 18. When the embedded contents 16 is generated in this way, the embedded watermark information of N bits can be securely detected in the same way as the first embodiment even when the embedded contents 16 is scaled.

Figure 10:
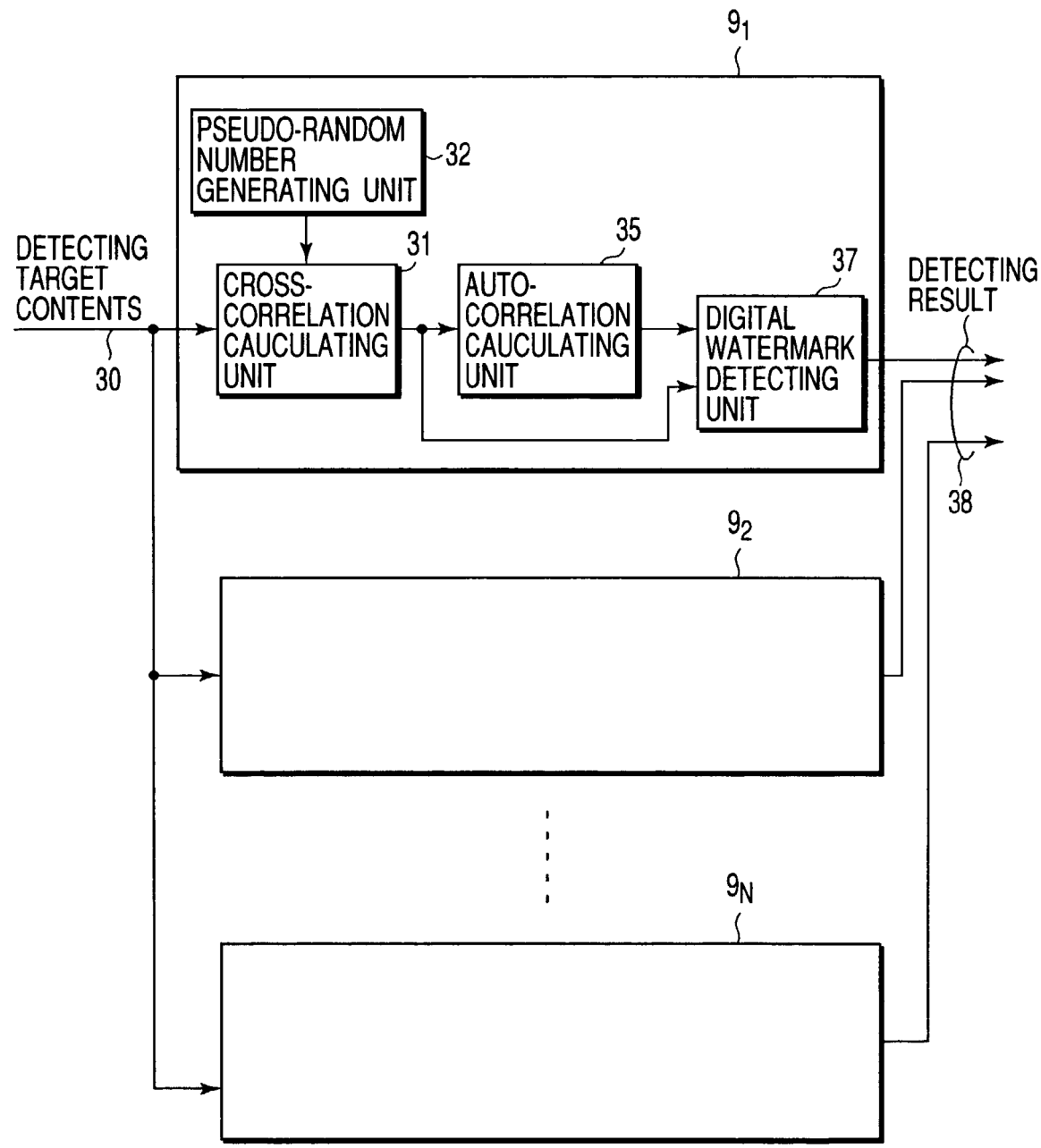
FIG. 10 is a block diagram showing an arrangement of a digital watermark detecting apparatus according to the second embodiment.

FIG. 10 is a view showing an arrangement of a digital watermark detecting apparatus according to the second embodiment. As shown in FIG. 9, while the digital watermark embedding apparatus includes the N-number of the digital watermark embedding units $8_1$ to $8_N$, the digital watermark detecting apparatus includes a plurality of digital watermark detecting units $9_1$ to $9_N$ wherein the digital watermark detecting apparatus including the cross-correlation calculating unit 31, the pseudo-random number generating unit 32, the auto-correlation calculating unit 35, and the digital watermark detecting unit 37 in FIG. 3 with respect to one detecting target contents 30 is one digital watermark detecting unit. In the same way as the first embodiment, the detecting results 38 of the digital watermark are generated by the digital watermark detecting units $9_1$ to $9_N$ the detecting results 38 as a whole are output as the detecting results of the digital watermark of the multi-bit.

According to the digital watermark embedding apparatus and the digital watermark detecting apparatus of the present invention, even when the embedded contents 16 are scaled in the same way as the first embodiment, the detecting results 38 of the digital watermark are not affected by the scaling and the embedded watermark information of N bits can be securely detected. There is also the same advantage as the first embodiment that the embedded contents 16 are robust against the attack such as the alteration or the erase of the digital watermark by outsider.

Procedure of the digital watermark embedding apparatus and the digital watermark detecting apparatus according to the above-described embodiments of the present invention can be carried out by not only hardware but also software.

Though the first cross-correlation value 34 is scaled during detecting the digital watermark in the above-described embodiments, the pseudo-random number sequence 33 may be scaled, it goes without saying that the same result as the scaling of the first cross-correlation value 34 can be obtained.

The periodic pseudo-random number sequence is used as the periodic sequence in the above-described embodiment. However, it is not always necessary to use the pseudo-random number sequence.

As described above, the digital watermark according to the embodiments of the present invention is robust against the scaling for the contents, the digital watermark embedding and digital watermark detecting can be stronger against the alteration or the erase of the digital watermark by the outsider.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the present invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means. The pseudo-random number sequence may be replaced by a number sequence whose auto-correlation has a periodic peak.

What is claimed is:

1. A digital watermark embedding apparatus comprising:
a digital watermark generator which generates a digital watermark by transforming an embedding target content with a coefficient of a periodic number sequence; and
an embedding unit which embeds the digital watermark in the embedding target content;
wherein the periodic number sequence comprises a periodic pseudo-random number sequence;
wherein the digital watermark generator generates the following digital watermark F[p]

$$F[p](z) = \sum_y f_y p(z+y)$$

where p represents the embedding target content;
z represents a parameter assigning a component of the embedding target content p;
$f_y$ represents the periodic pseudo-random number sequence; and
y represents an integer number expressing a number of a term of the periodic pseudo-random number sequence.

2. A digital watermark embedding method comprising:
generating a digital watermark by transforming an embedding target content with a coefficient of a periodic number sequence; and
embedding the digital watermark in the embedding target content;
wherein the periodic number sequence comprises a periodic pseudo-random number sequence;
wherein the digital watermark generating generates the following digital watermark F[p]

$$F[p](z) = \sum_y f_y p(z+y)$$

where p represents the embedding target content;
z represents a parameter assigning a component of the embedding target content p;

$f_y$ represents the periodic pseudo-random number sequence; and y represents an integer number expressing a number of a term of the periodic pseudo-random number sequence.

3. A digital watermark detecting apparatus comprising:

a transforming unit which transforms a detecting target content with a coefficient of a periodic number sequence;

a first cross-correlation calculator which calculates a first cross-correlation between the transformation result and the detecting target content;

an auto-correlation calculator which calculates an auto-correlation of the first cross-correlation;

a scaling rate calculator which calculates a scaling rate based on a peak position of the auto-correlation and a period of the periodic number sequence;

a scaling unit which scales one of the first cross-correlation and the periodic number sequence;

a second cross-correlation calculator which calculates a second cross-correlation between the first cross-correlation scaled and the periodic number sequence not scaled or between the first cross-correlation not scaled and the periodic number sequence scaled; and a detector which detects whether a digital watermark is embedded in the detecting target contents based on the second cross-correlation.

4. The apparatus according to claim 3, wherein the periodic number sequence comprises a periodic pseudo-random number sequence.

5. The apparatus according to claim 4, wherein the first cross-correlation calculator calculates the following first cross-correlation $C(\Delta 1)$ $$C(\Delta 1) = p'^* G_{66}[p']$$

where p' represents the detecting target content; and $G\Delta[p']$ represents the transformation result; and said auto-correlation calculator calculates the following auto-correlation $\Gamma(P')$ $$\Gamma(P') = \sum_{\Delta} C(\Delta 1) C(\Delta 1 + P')$$

where P' represents a peak position of the auto-correlation.

6. A digital watermark detecting method comprising:

transforming a detecting target content with a coefficient of a periodic number sequence;

calculating a first cross-correlation between the transformation result and the detecting target content;

calculating an auto-correlation of the first cross-correlation;

calculating a scaling rate based on a peak position of the auto-correlation and a period of the periodic number sequence;

scaling one of the first cross-correlation and the periodic number sequence;

calculating a second cross-correlation between the first cross-correlation scaled and the periodic number sequence not scaled or between the first cross-correlation not scaled and the periodic number sequence scaled; and detecting whether a digital watermark is embedded in the detecting target content based on the second cross-correlation.

7. The method according to claim 6, wherein the periodic number sequence comprises a periodic pseudo-random number sequence.

8. The method according to claim 7, wherein the first cross-correlation comprises the following first cross-correlation $C(\Delta 1)$ $$C(\Delta 1) = p'^* G_{66}[p']$$

where p' represents the detecting target content; and $G_{66}[p']$ represents the transformation result; and said auto-correlation comprises the following auto-correlation $\Gamma(P')$ $$\Gamma(P') = \sum_{\Delta} C(\Delta 1) C(\Delta 1 + P')$$

where P' represents a peak position of the auto-correlation.

9. A computer program product, having instructions that when executed by a processor perform steps comprising:

transforming a detecting target content with a coefficient of a periodic number sequence;

calculating a first cross-correlation between the transformation result and the detecting target content;

calculating an auto-correlation of the first cross-correlation;

calculating a scaling rate based on a peak position of the auto-correlation and a period of the periodic number sequence;

scaling one of the first cross-correlation and the periodic number sequence;

calculating a second cross-correlation between the first cross-correlation scaled and the periodic number sequence not scaled or between the first cross-correlation not scaled and the periodic number sequence scaled; and detecting whether a digital watermark is embedded in the detecting target content based on the second cross-correlation.

* * * * *